(12) United States Patent
Ness et al.

(10) Patent No.: US 7,002,443 B2
(45) Date of Patent: Feb. 21, 2006

(54) METHOD AND APPARATUS FOR COOLING MAGNETIC CIRCUIT ELEMENTS

(75) Inventors: Richard M. Ness, San Diego, CA (US); William N. Partlo, Poway, CA (US); Paul C. Melcher, El Cajon, CA (US); George X. Ferguson, San Diego, CA (US); Robert B. Saethre, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 365 days.

(21) Appl. No.: 10/607,407

(22) Filed: Jun. 25, 2003

(65) Prior Publication Data

US 2004/0264521 A1  Dec. 30, 2004

(51) Int. Cl.
   *H01F 27/08* (2006.01)
(52) U.S. Cl. .............................. 336/57; 336/55; 336/60; 376/207; 376/210
(58) Field of Classification Search ................... 336/55, 336/58, 57, 60; 376/207, 210
   See application file for complete search history.

(56) References Cited

U.S. PATENT DOCUMENTS 4,494,167 A * 1/1985 Molyneux-Berry ......... 361/270

(Continued)

*Primary Examiner*—Anh Mai
(74) *Attorney, Agent, or Firm*—William C. Cray; Cymer, Inc.

(57) ABSTRACT

An apparatus and method for providing cooling to a magnetic circuit element having a magnetic core disposed around a centrally located core support member having at least one core support member wall is disclosed which may comprise a core support coolant inlet; a core support coolant outlet; a plurality of interconnected coolant flow passages contained within the core support member wall and interconnected and arranged to pass coolant from one coolant flow passage to the next within the core support member wall along a coolant flow path within at least a substantial portion of the core support member wall from the core support coolant inlet to the core support coolant outlet. The apparatus may also comprise each core support coolant flow passage is in fluid communication with a fluid communication plenum at each end of each respective core support coolant flow passage, with each respective fluid communication plenum forming an outlet plenum for at least a first one of the respective core support coolant flow passages and an inlet plenum for at least a second one of the respective core support coolant flow passages along the coolant flow path from the core support coolant inlet to the core support coolant outlet. The core support member may comprise a flange extending from the core support member, the flange having an inner dimension and an outer dimension, which may also comprise a plurality of interconnected flange coolant flow passages extending alternatively toward the inner dimension and away from the outer dimension and then toward the outer dimension and away from the inner dimension, between the core support coolant inlet and the core support coolant outlet. The core and core support may be contained in a housing which may comprise a housing wall; a housing coolant inlet; a housing coolant outlet; and a plurality of interconnected housing coolant flow passages contained within the housing wall and interconnected and arranged to pass coolant from one coolant flow passage to the next within the housing wall along a coolant flow path within at least a substantial portion of the housing wall from the housing coolant inlet to the housing coolant outlet. The housing and core support may forma a part of at least a portion of an electrical current flow path forming two turns around the magnetic core. In another aspect of the invention buswork may be coated with a thin film of electrically conductive material.

50 Claims, 6 Drawing Sheets

U.S. PATENT DOCUMENTS

| | | | |
|---|---|---|---|
| 4,696,792 A * | 9/1987 | Hobson | 376/377 |
| 4,716,013 A * | 12/1987 | Veronesi et al. | 376/353 |
| 4,764,339 A * | 8/1988 | Lake et al. | 376/353 |
| 4,770,846 A * | 9/1988 | Land et al. | 376/353 |
| 4,902,998 A * | 2/1990 | Pollard | 336/60 |
| 4,983,859 A | 1/1991 | Nakajima et al. | 307/419 |
| 5,100,609 A * | 3/1992 | Oosterkamp | 376/210 |
| 5,325,407 A * | 6/1994 | Forsyth et al. | 376/205 |
| 5,448,580 A | 9/1995 | Birx et al. | 372/38 |
| 5,936,988 A | 8/1999 | Partlo et al. | 372/38 |
| 5,940,421 A | 8/1999 | Partlo et al. | 372/38 |
| 6,151,346 A | 11/2000 | Partlo et al. | 372/38 |
| 6,442,181 B1 | 8/2002 | Oliver et al. | 372/25 |

* cited by examiner

METHOD AND APPARATUS FOR COOLING MAGNETIC CIRCUIT ELEMENTS

RELATED APPLICATIONS

This application is related to U.S. Pat. No. 5,936,988, issued to Partlo, et al. on Aug. 10, 1999, entitled HIGH PULSE RATE PULSE POWER SYSTEM, on an application Ser. No. 09/118,773 filed on Jul. 18, 1998, which was a CIP of Ser. No. 08/990,848, filed Dec. 15, 1997, U.S. Pat. No. 5,940,421, now U.S. Pat. No. 5,940,421, issued to Partlo, et al. on Aug. 17, 1999, entitled CURRENT REVERSAL PREVENTION CIRCUIT FOR A PULSED GAS DISCHARGE LASER, and also to U.S. Pat. No. 6,151,346, issued to Partlo, et al. on Nov. 21, 2000, entitled HIGH PULSE RATE PULSE POWER SYSTEM WITH FAST RISE TIME AND LOW CURRENT, based on an application Ser. No. 09/370,739 filed on Aug. 9, 1999, which was a continuation in part of Ser. No. 08/990,848, filed on Dec. 13, 1997, now U.S. Pat. No. 5,940,421, issued to Partlo, et al. on Aug. 17, 1999, entitled, CURRENT REVERSAL PREVENTION CIRCUIT FOR A PULSED GAS DISCHARGE LASER, among others assigned to the common assignee of the present invention, the disclosures of each of which above cited patents is incorporated herein by reference. This application is also related to the application entitled Method and Apparatus for Electrically Interconnecting High Voltage Modules Positioned in Relatively Close Proximity, with inventors Saethre et al., Ser. No. 10/606,412, filed on the same day as this application and assigned to the same assignee as this application, the disclosure of which is hereby incorporated by reference.

FIELD OF THE INVENTION

The present invention relates to high speed and high power magnetic circuit elements such as inductive reactors and transformers and methods and apparatus for adequately cooling such apparatus.

BACKGROUND OF THE INVENTION

Turning to FIG. 1 there is shown a pulse power circuit known in the art. The pulse power circuit may include, e.g., a high voltage resonant power supply 30, commutator module 40, compression head module 60 and a laser chamber module 80. High voltage power supply module 20 can comprise, e.g., a 300 volt rectifier 22 for, e.g., converting the 208 volt three phase normal plant power from source 23, 10 to 300 volt DC. An inverter 24, e.g., converts the output of rectifier 22 to, e.g., high frequency 300 volt pulses in the range 100 kHz to 200 kHz. The frequency and the on period of inverter 24 can be controlled, e.g., by a HV power supply control board (not shown) in order to provide course regulation of the ultimate output pulse energy of the system, e.g., based upon the output of a voltage monitor 44 comprising, e.g., a voltage divider having, e.g., resistors $VDR_1$, and $VDR_2$.

The output of inverter 24 can be stepped up to about 1200 volts in step-up transformer 26. The output of transformer 26 is converted to 1200 volts DC by rectifier 28, which can include, e.g., a standard bridge rectifier circuit 28 and a filter capacitor 32. The DC output of circuit 20 can be used, e.g., to charge, e.g., an 8.1 $\mu$F charging capacitor $C_0$ 42 in commutator module 40 as directed by HV power supply control board (not shown), which can, e.g., control the operation of inverter 24. Set points, e.g., within HV power supply control board (not shown) can be provided by a laser system control board (not shown). In the discussed embodiment, e.g., pulse energy control for the laser system can be provided by power supply module 20.

The electrical circuits in commutator module 40 and compression head module 60 may, e.g., the serve to amplify the voltage and compress the electrical energy stored on charging capacitor $C_0$ 42 by power supply module 20, e.g., to provide 700 volts to charging capacitor $C_0$ 42, which during the charging cycle can be isolated from the down stream circuits, e.g., by solid state switch 46.

In the commutator module 40, which can comprise, e.g., charging capacitor Co 42, which can be, e.g., a bank of capacitors (not shown) connected in parallel to provide a total capacitance of, e.g., 8.1 $\mu$F, along with the voltage divider 44, in order to, e.g., provide a feedback voltage signal to the HV power supply control board (not shown) which is used by control board (not shown) to limit the charging of charging capacitor $C_0$ 42 to a voltage (so-called "control voltage"), which, e.g., when formed into an electrical pulse and compressed and amplified in the commutator 40 and compression head 60, can, e.g., produce the desired discharge voltage on a peaking capacitor $C_p$ 82 and across electrodes 83 and 84.

As is known in the art, the prior art circuit of FIG. 1 may be utilized to provide pulses in the range of 3 or more Joules and greater than 14,000 volts at pulse rates of 2,000–4,000 or more pulses per second. In such a circuit, e.g., about 250 microseconds may be required for DC power supply module 20 to charge the charging capacitor $C_0$ 42 to, e.g., 700 volts. Charging capacitor $C_0$ 42, therefore, can, e.g., be fully charged and stable at the desired voltage, e.g., when a signal from a commutator control board (not shown) is provided, e.g., to close a solid state switch 46, which, e.g., initiates a very fast step of converting the 3 Joules of electrical energy stored on charging capacitor $C_0$ 42 into, e.g. a 14,000 volt or more charge on peaking capacitor $C_p$ for creating a discharge across electrodes 83 and 84. The solid state switch 46 may be, e.g., an IGBT switch, or other suitable fast operating high power solid state switch, e.g., an SCR, GTO, MCT, high power MOSFET, etc. A 600 nH charging inductor $L_0$ 48 is in series with solid state switch 46 may also be employed, e.g., to temporarily limit the current through the solid state switch 46 while it closes to discharge the charge stored on charging capacitor Co 42 onto a first stage capacitor $C_1$ 52, e.g., forming a first state of pulse compression 50.

For the first stage 50 of pulse generation and compression, the charge on charging capacitor $C_0$ 42 is thus switched onto a capacitor, e.g., a 8.5 $\mu$F capacitor $C_1$ 52, e.g., in about 5 $\mu$s. A saturable inductor 54 holds off the voltage on capacitor $C_1$ 52 until it saturates, and then presents essentially zero impedance to the current flow from capacitor $C_1$ 52, e.g., allowing the transfer of charge from capacitor $C_1$ 52 through a, e.g., 1:23 step up pulse transformer 56 to charge capacitor $C_{p-1}$ capacitor 62 in the compression head module 60, with, e.g., a transfer time period of about 550 ns, comprising a first stage of compression.

The design of pulse transformer 56 is described in a number of prior patents assigned to the common assignee of this application, including, e.g., U.S. Pat. No. 5,936,988 referenced above. Such a transformer is an extremely efficient pulse transformer, transforming, e.g., a 700 volt 17,500 ampere, 550 ns pulse, e.g., a 16,100 volt, 760 ampere 550 ns pulse, which, e.g., is stored very temporarily on compression head module capacitor $C_{p-1}$ 62, which may also be, e.g., a bank of capacitors. The compression head module 60 may, e.g., further compress the pulse. A saturable reactor inductor $L_{p-1}$ 64, which may be, e.g., about a 125 nH saturated inductance, can, e.g., hold off the voltage on capacitor $C_{p-1}$ 62 for approximately 550 ns, in order to, e.g, allows the charge on $C_{p-1}$ to flow, e.g., in about 100 ns, onto a peaking capacitor $C_p$ 82, which may be, e.g., a 16.5 nF capacitor located, e.g., on the top of a laser chamber (not shown) and which the peaking capacitor $C_p$ 82 is electrically connected in parallel with electrodes 83 and 84. This transformation of a, e.g., 550 ns long pulse into a, e.g., 100 ns long pulse to charge peaking capacitor Cp 82 can make up, e.g., the second and last stage of compression. About 100 ns after the charge begins flowing onto peaking capacitor $C_p$ 82 mounted on top of and as a part of the laser chamber (not shown) in the laser chamber module 80, the voltage on peaking capacitor $C_p$ 82 will have reached, e.g., about 14,000 volts and a discharge between the electrodes 83 and 84 begins. The discharge may last, e.g., about 50 ns, during which time, e.g., lasing occurs within the resonance chamber (not shown) of the, e.g., excimer laser.

The circuitry of the prior art FIG. 1 may also include, e.g., a bias circuit defined by bias current source $I^-$ and a bias current $I^+$. Bias inductors, e.g., inductors $L_{B1}$, and $L_{B2}$ may be connected, e.g., to bias current source $I^-$ and $I^+$, respectively, and also to, e.g., first stage compressor circuit 50, e.g., between a diode 47 on the output of solid state switch 46 and charging inductor $L_0$ 48 and between compression head capacitor $C_{p-1}$ 62 and compression head saturable inductor $L_{p-1}$ 64, respectively. Bias current source $I^-$ can, e.g., supply a bias, which can, e.g., presaturate saturable inductor $L_1$. Inductor $L_{B1}$ may, e.g., have a relatively high inductance value to provide a relatively long time constant in the bias circuit relative to those of compression head module 60, thereby, e.g., isolating bias current source $I^+$ from pulse power. Similarly bias current $I^+$ can bias compression head saturable inductor $L_{p-1}$ 64 (returning to ground through bias inductor $L_{B3}$) and pulse transformer 56 (returning to ground through the transformer 56 secondary winding.

After the discharge between the electrodes 83, 84 capacitor $C_p$ may be driven to a negative polarity charge, e.g., because of an impedance mismatch between circuit 40, 50, 60, 80 and the laser chamber module electrodes 83, 84, and, e.g., because saturable inductor $L_{p-1}$ is already presaturated with respect to forward current from capacitor $C_{p-1}$ to capacitor $C_p$, instead of having energy ringing between the electrodes 83, 84, for example eroding the electrodes 83, 84, the reverse charge on capacitor $C_p$ is instead transferred resonantly back into capacitor $C_{p-1}$ and so forth back to capacitor $C_0$, precharging capacitor $C_0$ before charging from the power supply 20 for the next pulse. In this manner, the electronic circuitry can, e.g., recover excess energy on charging capacitor $C_0$ 42 from the previous pulse which substantially reduces waste energy and virtually eliminates after ringing in the laser chamber module 80.

This is facilitated also by, e.g., an energy recovery circuit 57, which may be composed of, e.g., energy recovery inductor 58 and energy recovery diode 59. The series combination of the two connected in parallel across charging capacitor Co 42 can, e.g., because the impedance of the pulse power system is, e.g., not exactly matched to that of the chamber and due, e.g., to the fact that the chamber impedance varies several orders of magnitude during a pulse discharge, a negative going "reflection" may be generated from the main pulse across the electrodes 83, 84, which can propagate back towards the front end of the pulse generating system 40, 50, 60, 80.

After the excess energy has propagated back through the compression head 60 and the commutator 40, solid state switch 46 opens up, e.g., due to the removal of the trigger signal for solid state switch 46 by the controller (not shown). The energy recovery circuit 57 can, e.g., reverse the polarity of the reflection which has generated a negative voltage on the charging capacitor $C_0$ 42 through, e.g., resonant free wheeling (a half cycle of ringing of the L-C circuit made up of the charging capacitor $C_0$ 42 and the energy recovery inductor 58 as clamped against, e.g., reversal of current in inductor 58 due to diode 59). The net result can be that substantially all of the reflected energy from the chamber module 80 can be recovered from each pulse and stored on charging capacitor $C_0$ 42 as a positive charge ready to be utilized for the next pulse.

The DC bias circuitry noted above can serve to assist in more completely utilizing the full B-H curve swing of the magnetic materials used in the saturable inductors and the pulse transformer. Also as noted above, a bias current is provided to each saturable inductor $L_0$ 48, $L_1$ 54 and $L_{p-1}$ 64 such that each inductor $L_0$ 48, $L_1$ 54 and $L_{p-1}$ 64 is reverse saturated at the time a pulse is initiated by the closing of solid state switch 46. In the case of the commutator module 40 saturable inductors $L_0$ 48 and $L_1$ 54, this is accomplished by providing a bias current flow of approximately 15A backwards, compared to the normal pulse current flow, i.e., in the direction of $I^-$ from bias current source 120 through the inductors $L_0$ 48 and $L_1$ 54. Actual current flow travels from the power supply through the ground connection of the commutator, through the primary winding of the pulse transformer 56, through saturable inductor $L_1$ 54, through saturable inductor $L_0$ 48, and through isolation inductor $L_{B1}$ back to the bias current source 120 as indicated by arrows $B_1$. In the case of compression head saturable inductor, e.g., a bias current $B_2$ of approximately 5A is provided from a second bias current source 126 through isolation inductor $L_{B2}$. At the compression head module 60, the current splits and a fraction goes through saturable inductor $L_{p-1}$ 64 and back through isolation inductor $L_{B3}$ back to the second bias current source 126. The remainder of the current $B_{2-2}$ travels back through an HV cable connecting the compression head module 60 and the commutator module 40, through the pulse transformer 56 secondary winding to ground, and through a biasing resistor (not shown) back to the second bias current source 126. This second current may be used, e.g., to bias the pulse transformer 56, e.g., so that it is also reset for the pulsed operation. The amount of current which splits into each of the two legs may be determined, e.g., by the resistance in each path and may be adjusted such that each path receives the correct amount of bias current.

The flow of pulse energy through the system 40, 50, 60, 80 from the plant power source 23 to the electrodes 83, 84 and to ground beyond electrode 84 as referred to as "forward flow" and this direction as the forward direction. When referring to an electrical component such as a saturable inductor as being forward conducting, this mean that it is biased into saturation to conduct "pulse energy" in a direction toward the electrodes—the forward direction. When it is reverse conducting it is driven into saturation in the reverse direction, and may be biased in such direction. The actual direction of current flow (or electron flow) through the system depends on the point of observation within the system and the time of observation.

Charging capacitor $C_0$ 42 may be charged with (for example) a positive 700 volts such that when solid state switch 46 is closed current flows from charging capacitor $C_0$ 42 through charging inductor $L_0$ 48 and first stage compression inductor $L_1$ in a direction toward first stage compression capacitor $C_1$ 52. Similarly, the current flow is from C1 52 through the primary side of pulse transformer 56 toward ground. Thus, the direction of current and pulse energy is the same from charging capacitor $C_0$ 42 to pulse transformer 56. Current flow in both the primary loops and the secondary loop of pulse transformer 56 may both be, e.g., toward ground.

Solid state switch 46 may be an P/N CM 1000 HA-28H IGBT switch provided by Powerex, Inc. of Youngwood, Pa.

It is clear that circuits operating with such high voltages and currents and more particularly including magnet circuit components operating at very high pulse repetition rates, e.g., up to 4000 Hz or more, generate extreme amounts of heat. This is perhaps most critical for the compression head magnetic saturable inductor/reactor $L_{p-1}$, but is applicable to all of the saturable reactors/inductors in the pulse power supply system 40, 50, 60, 80. It is also a critical factor of operation of the step up pulse transformer 56. In the past these magnetic circuit elements have been cooled using, e.g., a cold plate with one or more passages through the plate, usually separated by substantial expanses of cold plate between such passages, e.g., as shown in U.S. Pat. No. 5,448,580, issued to Birx, et al. on Sep. 5, 1995, entitled AIR AND WATER COOLED MODULATOR, on a application Ser. No. 270,718, filed on Jul. 5, 1994. Cooling has also been proposed by conductively coupling, e.g., a coil of piping containing cooling liquid, e.g., water, in contact with the outside of the housing of such a magnetic circuit element, e.g., as shown in U.S. Pat. No. 6,442,181, entitled EXTREME REPETITION RATE GAS DISCHARGE LASER, issued to Oliver, et al. on Aug. 27, 2002, on an application Ser. No. 09/684,629, filed on Oct. 6, 2000, as a continuation-in-part of Ser. No. 09/370,739, filed Aug. 9, 1999 now U.S. Pat. No. 6,151,346, which was a continuation-in-part of Ser. No. 09/118,773, filed Jul. 18, 1998 now U.S. Pat. No. 5,936,988 and Ser. No. 09/608,543, filed Jun. 30, 2000, all of which are assigned to the common assignee of the present application, and the disclosures of which are hereby incorporated by reference. This patent also shows an even less effective method of using heat sink type cooling fins on the outside of the housing of such a magnetic circuit element. Of course liquid had also been put into the housing in contact with the conductors and core magnetic pieces, which, for obvious reason must be a dielectric, e.g., transformer oil or other suitable dielectric cooling fluid, e.g., Brayco Micronic 889 made by Castrol, or any of a number of well known Fluorinert compounds. Such liquid insulators may prove to be unacceptable, in part, due to a tendency to break down with sloid particulate or water or other contaminant over time. U.S. Pat. No. 4,983,859, entitled MAGNETIC DEVICE FOR HIGH-VOLTAGE PULSE GENERATING APPARATUSES, issued to Nakajima, et al. on Jan. 8, 1991 also proposes using such a fluid and circulating it through the inside of the housing. Such a system, among other drawbacks, could not be used in a facility having high clean room requirements, i.e., semiconductor manufacturing facilities, because of the need to pump and circulate the cooling oil. Other prior art uses include using such a fluid statically sealed within the housing, which may, e.g., due to convection currents in the fluid cause circulatory action within the housing which may serve to at least assist in carrying heat energy away from the conductors and magnetic pieces generating the principal amounts of the heat energy to the housing for further heat exchange as discussed in the art referenced above.

With the even higher requirements for voltage and pulse repetition rate and reduced time between pulse bursts, i.e., a higher duty cycle, the heat energy released in such magnetic circuit elements is increasingly more difficult to mediate. This is even more critical in machines such as laser light sources for, e.g., UV and EUV and shorter wavelength light requiring very high pulses of very high pulse repetition rate with very narrow, on the order of 1 ns or less pulse duration with very little lack of variation pulse to pulse, due to critical magnetic characteristics of magnetic circuit elements used in such pulse generation equipment being very susceptible to temperature related drift, at least, if not failure to properly perform unless temperatures are more tightly controlled than has ever before been the case. The prior art methods and apparatus discussed above and their equivalents have served for past requirements but are rapidly becoming, if not already, inadequate. There is a need, therefore in the art of such magnetic circuit elements for an improved method and apparatus for the removal of the heat energies generated by the conductors, magnetic core pieces and the like while maintaining electrical isolation between parts being cooled and without the use of circulated fluids, e.g., such as oil, which can potentially be detrimental to, e.g., clean room environments.

The physical structure of the pulse step up transformer is also described in a number of prior patents assigned to the common assignee of the present application, including, e.g., U.S. Pat. No. 6,151,346, issued to Partlo, et al. on Nov. 21, 2000, entitled HIGH PULSE RATE PULSE POWER SYSTEM WITH FAST RISE TIME AND LOW CURRENT and U.S. Pat. No. 5,940,421, issued to Partlo, et al. on Aug. 17, 1999, entitled, CURRENT REVERSAL PREVENTION CIRCUIT FOR A PULSED GAS DISCHARGE LASER, referenced above.

In high voltage applications, such as those just discussed, it is necessary to have an electrical insulator between two conducting metal parts in order to hold off the applied voltage with a potential difference between individual parts. In many cases air alone, though an insulator, is not sufficient. Furthermore, in many cases insulation between such metallic parts may need to exist in more than one axis. In known inductors utilized in known circuits, such as those just discussed, an insulator, such as Kapton (polyimide), may have been used to isolate metallic components. In such case, e.g., in the inductor housing shown in FIG. 8B of the above referenced U.S. Pat. No. 5,936,988, a sheet of insulator, e.g., Kapton, may be utilized by inserting it between the inner wall of the housing shown in that Figure and the metallic elements, e.g., magnetic cores 301 and 302 shown in that Figure, i.e., forming a cylinder generally abutting the interior wall of the inductor housing. Also in known inductors this sheet may form a cylinder abutting another interior cylindrical wall formed within the interior of the housing (not shown in that Figure). A sheet of such material may also be cut to an appropriate shape and size and inserted into the housing to cover, e.g., the housing floor and separate the housing floor from nearby electrically energized metallic components within the housing. Such arrangements have proved unsatisfactory for a number of reasons, including the propensity for improper fit and/or the existence of deformations causing, e.g., gaps in the coverage allowing arcing and other undesirable effects (e.g. air bubbles may also form between the insulator sheet and the housing, leading to dielectric mis-match conditions and electric field enhancements which may then cause electrical breakdowns).

Alternatively, where form and fit allow, which will not always be the case, it might be possible to machine, e.g., an open ended toroidally shaped piece of the insulating material and to place a similarly shaped toroidal component within the opening. This however, could be very expensive, as the machined out insulating material, e.g., Mylar or Kapton, would simply have to be discarded. In addition, gaps and the attendant problems could still arise where another sheet of the insulating material is used to attempt to close the opening at the top of the open toroidal insulation structure.

It is desirable, therefore to find a solution to these problems in high power high pulse rate magnetic circuit elements and the like.

SUMMARY OF THE INVENTION

An apparatus and method for providing cooling to a magnetic circuit element having a magnetic core disposed around a centrally located core support member having at least one core support member wall is disclosed which may comprise a core support coolant inlet; a core support coolant outlet; a plurality of interconnected coolant flow passages contained within the core support member wall and interconnected and arranged to pass coolant from one coolant flow passage to the next within the core support member wall along a coolant flow path within at least a substantial portion of the core support member wall from the core support coolant inlet to the core support coolant outlet. The apparatus may also comprise each core support coolant flow passage is in fluid communication with a fluid communication plenum at each end of each respective core support coolant flow passage, with each respective fluid communication plenum forming an outlet plenum for at least a first one of the respective core support coolant flow passages and an inlet plenum for at least a second one of the respective core support coolant flow passages along the coolant flow path from the core support coolant inlet to the core support coolant outlet. The core support member may comprise a flange extending from the core support member, the flange having an inner dimension and an outer dimension, which may also comprise a plurality of interconnected flange coolant flow passages extending alternatively toward the inner dimension and away from the outer dimension and then toward the outer dimension and away from the inner dimension, between the core support coolant inlet and the core support coolant outlet. The core and core support may be contained in a housing which may comprise a housing wall; a housing coolant inlet; a housing coolant outlet; and a plurality of interconnected housing coolant flow passages contained within the housing wall and interconnected and arranged to pass coolant from one coolant flow passage to the next within the housing wall along a coolant flow path within at least a substantial portion of the housing wall from the housing coolant inlet to the housing coolant outlet. The housing and core support may forma a part of at least a portion of an electrical current flow path forming two turns around the magnetic core. In another aspect of the invention, buswork may be coated with a thin film of electrically conductive materials.

DETAILED DESCRIPTION OF PREFERRED EMBODIMENTS

Figure 3:
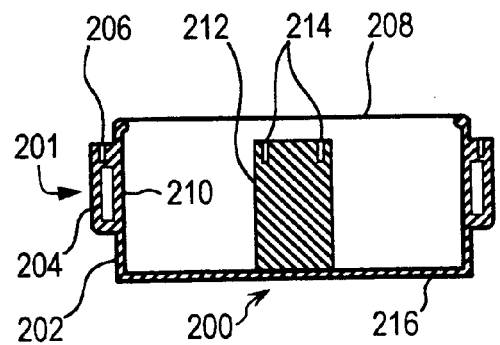
FIG. 3 shows a cross sectional view of the housing of FIG. 2 along lines 3—3 in FIG. 2.
Figure 2:
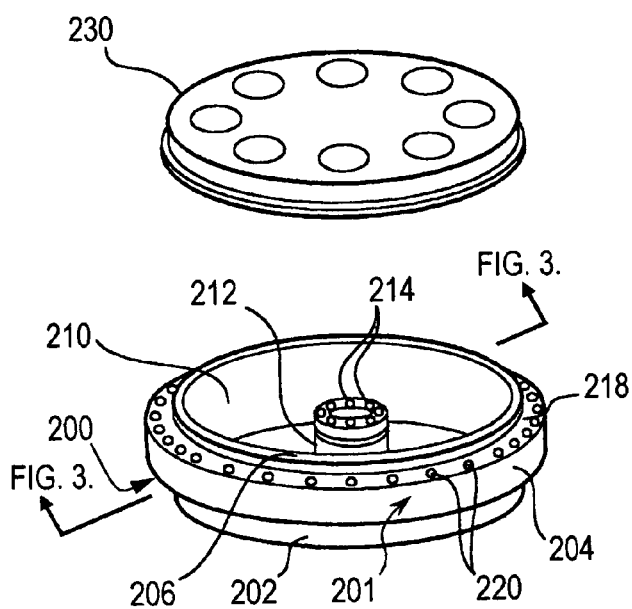
FIG. 2 shows a perspective view of a magnetic inductive reactor housing according to an embodiment of the present invention.

Turning now to FIG. 2, there is shown a perspective view of a magnetic inductive reactor housing 200 according to an embodiment of the present invention. The housing 200 may be generally cylindrical in shape and have, e.g., a bottom section 202, a middle section 204 and an upper section 206. The ledge 218 may have an annular sealing groove 232, shown in FIG. 4, into which an annular sealing ring (not shown) e.g., an o-ring made, e.g., of "viton" may be inserted. The housing cover 230 may be attached to the side wall 210 by means of an annular retaining ring (not shown) that engages an annular flange (not shown) on the cover 230 and is attached to the side wall 210 by screws threaded into of threaded holes 220 formed in a ledge 218 forming a portion of the upper section 206. The housing 200 may also have a central column 212 which may be attached to a bottom plate 216 of the housing 200, e.g., by welding, e.g., by vacuum brazing utilizing any of the well known techniques for such vacuum brazing known in the art. Alternatively, the entire bottom section 202 along with the bottom plate 216 and the center column 212 may be machined out of a single piece of material. The central column 212 may have a plurality of threaded holes 214 for attaching the housing 200 cover 230 to the housing 200, e.g., by a plurality of screws (not shown), which can serve also to make electrical contact between the housing cover 230 and the central cylinder 212. As shown in FIG. 3, the housing 200 may have a top plate 208 forming a portion of the sealing of the housing 200.

Figure 4:
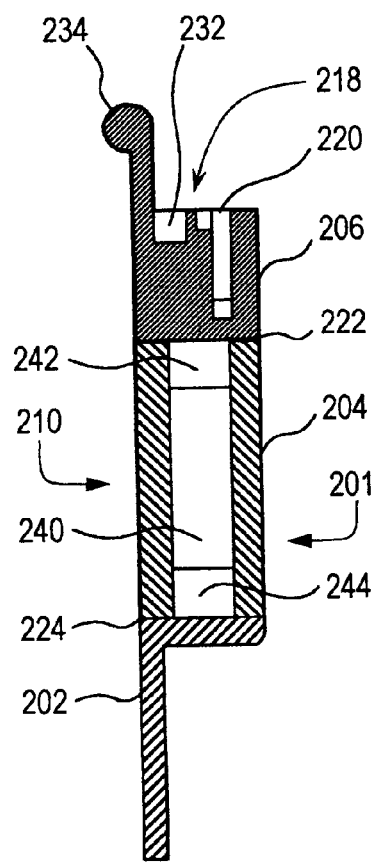
FIG. 4 shows a more detailed cross sectional view of the side wall portion of the housing shown in FIGS. 2 and 3.

Turning now to FIG. 4 the side wall 210 of the housing 200 is shown in more detail, with the interior surface 211 of the side wall 210 shown on the left looking at FIG. 4. The bottom section 202 of the housing 200 side wall 210 may be attached to the middle section 244 by a vacuum brazing connection 224. The central section 204 may be connected to the upper section 206 also by a vacuum brazing connection 222. As can be seen in cross section in FIG. 4, the central portion 204 of the housing 200 side wall 210 may have formed within it a plurality of generally vertical coolant passages 240, each of which may be in fluid communication with a housing wall coolant upper plenum 242 and a housing wall coolant lower plenum 244.

Figure 5:
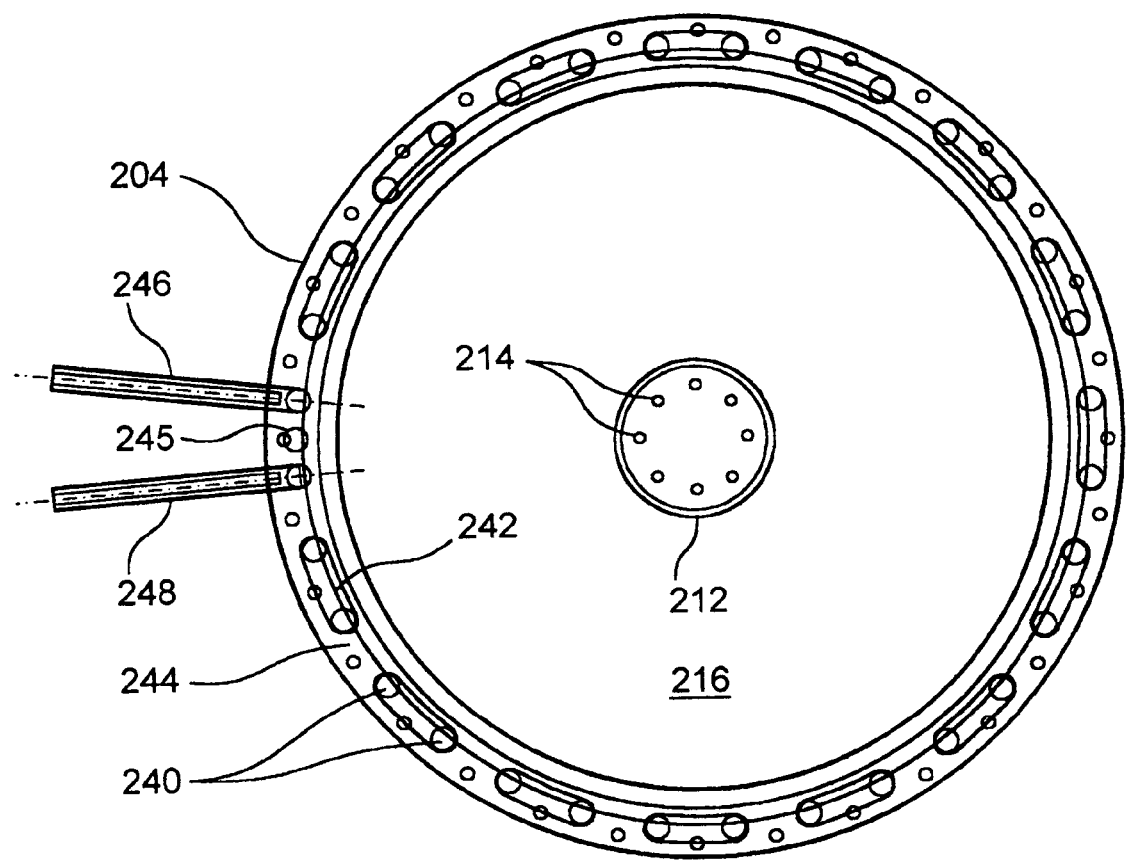
FIG. 5 shows a top view of the housing of FIGS. 1–3 with the upper section of the housing removed for clarity.

Turning now to FIG. 5, three is shown a top view of the housing 200 with the upper section 206 of the housing 200 side wall 210 removed for clarity. FIG. 5 shows that each of the coolant passages 240 in the middle section 204 of the housing 200 side wall 210 is in fluid connection with each of its neighbor coolant passage 240, either through a housing 200 coolant upper plenum 242, which may be formed by a groove machined in top rim of the middle section 204, or by a housing coolant lower plenum 244, each indicated by phantom lines in FIG. 5, which may be formed by a groove machined in the bottom rim of the housing 200 center section. The only two such coolant passages 240 not so connected are the ones connected, respectively, to the coolant inlet pipe 246 and the coolant outlet pipe 248. These two coolant passages connected to the coolant inlet pipe 246 and the coolant outlet pipe 248 are separated by a hollow vacuum filled hole 245. It will be understood that the coolant, e.g., water, may be utilized as a housing 200 heat removal system, for removing heat entering the housing side wall 210, bottom plate 216 and top plate 208 and/or cover 230 due to the heat generated within the housing 200 by the operation, e.g., the magnetic reactive inductor circuit element, as more fully described below, contained within the housing.

The coolant may be introduced through the inlet pipe 246 into the respective coolant passage 240 in fluid communication with the inlet pipe 246 as shown in FIG. 5 after which it passes down through the respective coolant passage to a housing wall coolant lower plenum, shown in phantom in FIG. 5. At this lower coolant plenum, the respective coolant passage 240 is placed in fluid communication with the next successive coolant passage 240 which returns the coolant to a housing wall coolant upper plenum, which in turn places this next respective coolant passage 240 in fluid communication with a further successive coolant passage 240, and so forth, until the coolant is passed to the respective coolant passage 240 in fluid communication with the coolant outlet pipe 248, where the coolant may be returned to a suitable heat removal unit (not shown) e.g., a suitable heat exchanger. It will also be understood that the coolant passages 240 and the respective housing wall coolant upper plenums 242 and housing wall coolant lower plenums 244 may be machined into the center section 204 of the housing 200 side wall 210, before the lower section 202 and the upper section 206 are attached to the center section as described above.

Figure 6:
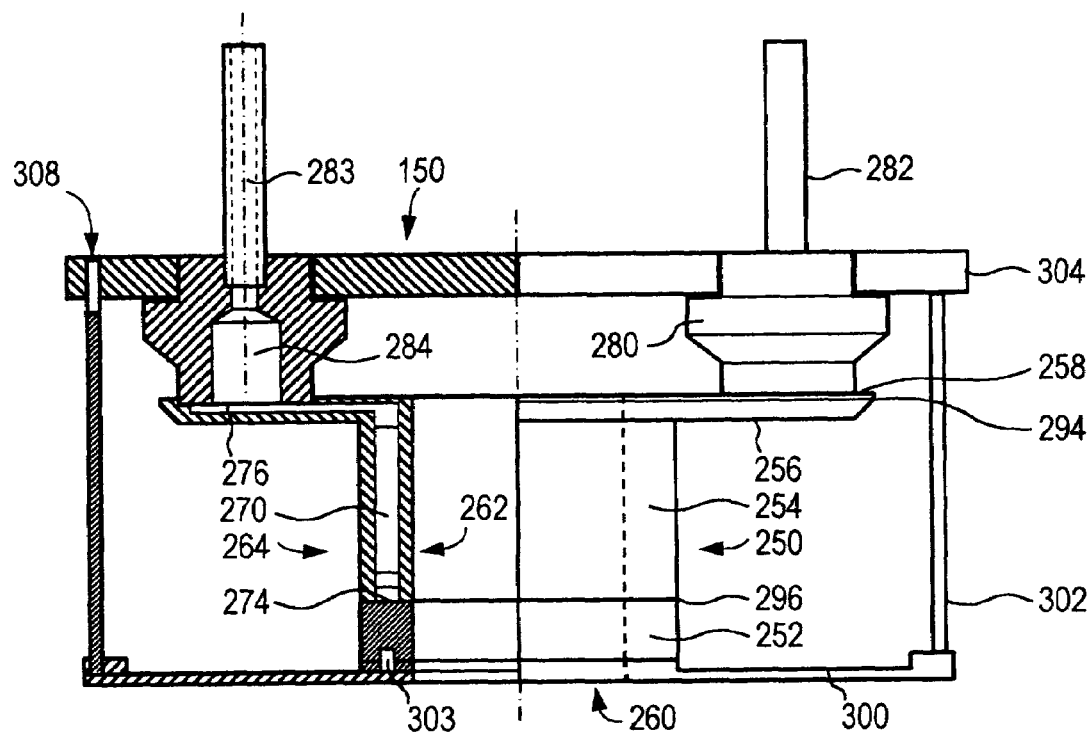
FIG. 6 shows a partially cut away view, along lines 6—6 of FIG. 8 of a magnetic core basket assembly according to an embodiment of the present invention.
Figure 8:
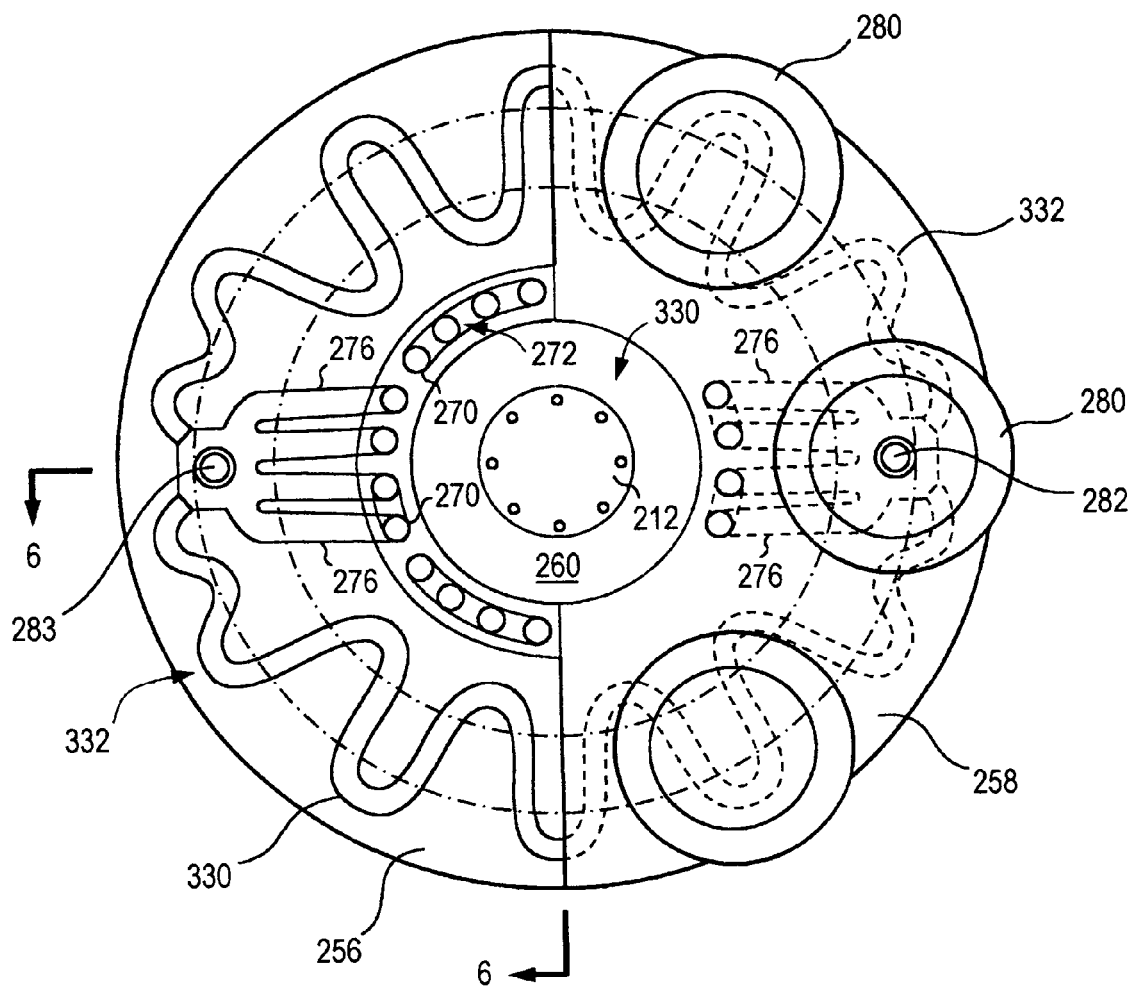
FIG. 8 shows a top view of the mandrel forming part of the magnetic core basket assembly of FIG. 6, according to an embodiment of the present invention; and, FIG. 9 shows an alternative embodiment of the present invention applied to a pulse power transformer winding shroud and mandrel according to an embodiment of the present invention.

Turning now to FIG. 6, there is shown a partially cut away view, along lines 6—6 of FIG. 8 of a magnetic core basket assembly 150 according to an embodiment of the present invention. The magnetic core basket assembly 150 may comprise, e.g., a mandrel 250, which may include, e.g., a generally cylindrical mandrel lower section 252, a generally cylindrical mandrel middle section 254, which may include an integrally formed mandrel flange bottom portion 256 (it being understood that such directions as top and bottom are used herein only for convenient reference to the orientation shown in the Figures). The mandrel 250 may also include a mandrel flange top portion 258. The mandrel 250 lower section 252, middle section 254 and mandrel flange bottom portion 256 and top portion 258 define a central generally cylindrical opening 260. The mandrel lower section may be attached to the mandrel middle section 254, e.g., by vacuum brazing and the mandrel flange bottom portion 256 may similarly be attached to the mandrel flange top portion 258 by, e.g., vacuum brazing.

Attached to the mandrel flange top portion 258, e.g., by vacuum brazing may be a plurality of, e.g., six, standoffs 280, two of which (the ones shown in FIG. 6, and as shown in cross section in FIG. 6) may be connected to a coolant system (not shown) through a mandrel inlet pipe 282 and a mandrel outlet pipe 283, in communication with an inlet/outlet plenum 284 internal to the respective standoff as shown in cross section in FIG. 6. Also as shown in FIG. 6, the respective mandrel inlet or outlet plenum 284 may be in fluid communication with a respective set of four inlet/outlet plenum fingers 276, which may be formed in the mandrel flange bottom portion 256 by machining grooves in the upper surface of the mandrel flange bottom portion 256, and by thereafter attaching the mandrel flange top portion 258 to the mandrel flange bottom portion 256 as discussed above. It will be understood that matching grooves to the grooves forming, e.g., the inlet/outlet fingers 276, may also be formed in the underside of the mandrel flange top section 258, but in the embodiment illustrated here only the bottom portion 256 of the mandrel flange is shown to have the respective grooves. The mandrel lower section 252 and mandrel middle section 254 also form a generally cylindrical mandrel wall having an inner sidewall 262 and an outer sidewall 264. As shown in cross section in FIG. 6, the mandrel middle portion 254 may contain a plurality of mandrel coolant passages 270, extending generally vertically in the mandrel middle portion 254. Each of the mandrel coolant passages 270 is in fluid communication with both a mandrel middle section upper coolant mixing plenum 272 and a mandrel middle section coolant mixing plenum 274, as shown in more detail in FIG. 7, with the exception of the two mandrel coolant passages 270 in fluid communication with the two fingers 276 extending from the mandrel coolant inlet plenum 284 in fluid communication with the mandrel coolant inlet pipe 282 and the mandrel coolant outlet pipe 283, respectively.

Figure 7:
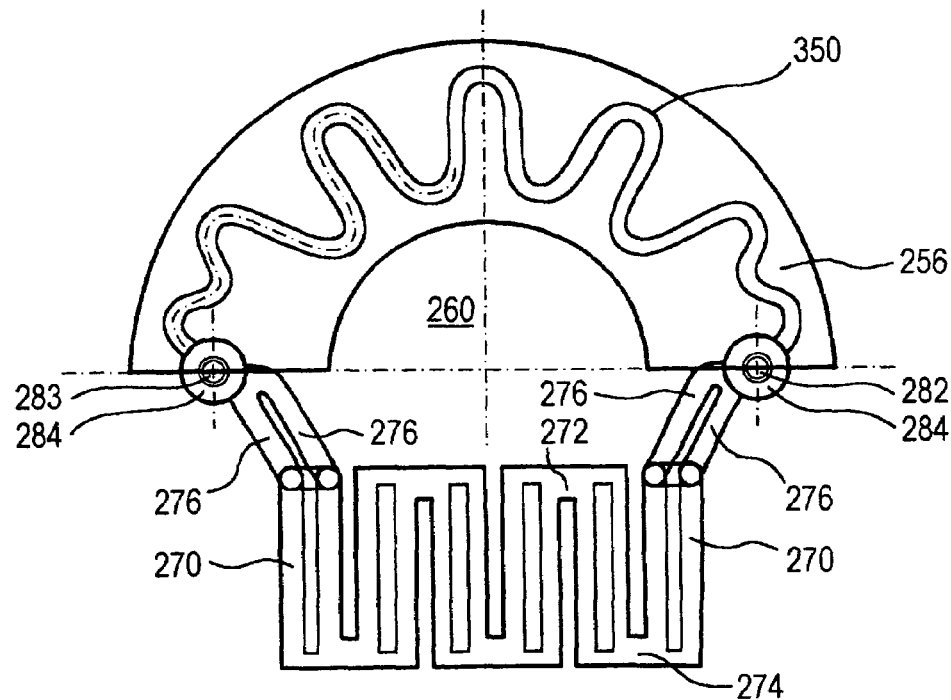
FIG. 7 shows a schematic view of coolant passages formed in the mandrel forming part of the magnetic core basket assembly of FIG. 6, according to an embodiment of the present invention.

FIG. 7 shows a schematic view of the coolant passages 270 formed in the mandrel middle section 254 extending, e.g., around 180° the mandrel middle section 256, forming generally two parallel flow paths from the inlet pipe 282 to the outlet pipe 283, with mixing in the respective mandrel coolant upper mixing plenums 272 and mandrel coolant lower mixing plenums 274. The coolant may, e.g., enter the fingers 276 in fluid communication with the inlet pipe 282 through the respective standoff 280 internal plenum 284, shown on the right side of FIG. 7 and in parallel enter each of the respective two mandrel coolant passages 270 in fluid communication with the respective finger 276. These two respective coolant passages 270 are in turn in fluid communication with a respective one of a plurality of the mandrel middle section coolant lower mixing plenums 274, where the coolant mixes and then passes in parallel through two additional coolant passages 270 into a respective one of a plurality of mandrel middle section coolant upper mixing plenums 272, and so forth until the coolant reaches the respective one of the plurality of mandrel middle section coolant lower mixing plenums 274 in fluid communication with the respective pair of coolant passages 270 in fluid communication with the respective standoff outlet plenum 284 in fluid communication with the standoff outlet pipe 283, shown on the left in FIG. 7.

It will be understood that an identical system of fingers 276, coolant passages 270, coolant upper mixing plenums 272 and coolant lower mixing plenums 274 may, e.g., carry the coolant from the inlet pipe 282 to the outlet pipe 283 around the other 180° of the mandrel middle section 254, as is shown in the top view of FIG. 8. Turning now to FIG. 8, a top partially cut-away view of the mandrel 250, along with FIG. 7, there is shown the formation in the mandrel middle section flange bottom portion 256 a serpentine flange cooling passage 330. The serpentine flange cooling passage 332 serves to balance the cooling of the flange from its inner diameter to its outer diameter by forming generally symmetrical loops from nearly adjacent the inner radius of the mandrel flange 256, 258 to nearly adjacent the outer radius of the mandrel flange 256, 258. This is only varied, e.g., in the vicinity of the fingers 276, which serve to carry coolant toward the inner radius of the flange 256, 258. It will also be understood, as with the housing center section 204, the coolant passages 270 and plenums 272, 274, along with the groves forming the fingers 276 and the serpentine flange cooling channel 330 may be machined before the mandrel lower section 252 and the flange top portion 258 are attached to the mandrel middle section 254 and flange bottom portion 256, respectively, as for example by vacuum brazing.

The magnetic core basket assembly 150 also may have attached to the mandrel lower section a generally circular bottom plate 300, which may be attached to the mandrel lower section 252, e.g., by screws (not shown) threaded through the bottom plate 300 into threaded holes 303 in the mandrel lower section 252. The magnetic core basket assembly 150, including a plurality of standoffs 302 spaced around the circumference of the flange 256, 258 and bottom plate 300 and attached to the flange 256, 258 and bottom plate 300 through threaded openings 308 and 306, respectively, serves to encage one or more magnetic cores (not shown). The magnetic cores may be, e.g., formed by one or more toroidally shaped pieces of magnetic material. These may be formed, e.g., by a toroidally shaped piece of metal, e.g., aluminum, which may have wound on it like a spool of tape a magnetic tape, e.g., made of nickel or iron or a nickel-iron alloy, thereby forming a core which fits over the mandrel 250 with the aluminum in electrical contact with the mandrel bottom section 252, or middle section 254, or in at least one case with both. In some cases, e.g., due to manufacturing tolerances, in order to insure good electrical contact between the mandrel 250 bottom section 252 and or middle section 254, a shim of a suitable conductive material, e.g., a copper shim in the form of, e.g., a tape of a sheet, may be inserted between the aluminum toroid (not shown) and the mandrel 250. The magnetic cores (not shown) may, e.g., be inserted over the mandrel 250 bottom section 252 and middle section 254 and be held in place by the bottom plate 300. The basket assembly 150 may also have a top plate 304 which may be, e.g., fitted with holes through which the standoffs 280 extend. The top plate 304 may also be attached to the center column 212, e.g., by screws (not shown) threaded into the threaded holes 214.

The mandrel 250, including the flange 256, 268 and the standoffs 280 may be made of nickel plated copper, and the top and bottom plates may also be made of nickel plated copper. The standoffs 302 may be made, e.g., of aluminum. The bottom plate 300 and top plate 304 may be coated with a suitable dielectric material, including within the openings through which the standoff 280 extend, which may be, e.g., a sprayed on coating of parylene. The interior walls and the portion of the housing 200 side wall extending over the protrusion 234 and down to the sealing groove 218 may also be coated with parylene for insulation purposes. It will be understood that, in operation, the magnetic inductive reactor may be connected in the circuit of FIG. 1 with the cover 230 in electrical contact with, e.g., capacitor $C_{p-1}$ in, e.g., the compression head module 60, with current thus passing through the cover 230 and into the standoffs 280 in electrical contact with the cover 230 through the mandrel middle section 254 and bottom section 252 and into the bottom plate, through the screws in the holes 303 and then up the standoffs 302, electrically connected to the bottom plate 300 by the screws in holes 306 and thence into the top plate through the screws in holes 308 and thereafter to the center column through the screws in holes 214 and out the bottom of the housing 200 connected electrically in the circuit, e.g., to the next stage capacitor, e.g., $C_p$. Therefore the housing 200 and the magnetic cores (not shown) contained within the magnetic core basked assembly 150 may form, e.g., a two turn inductive element, e.g., $L_{p-1}$.

Figure 1:
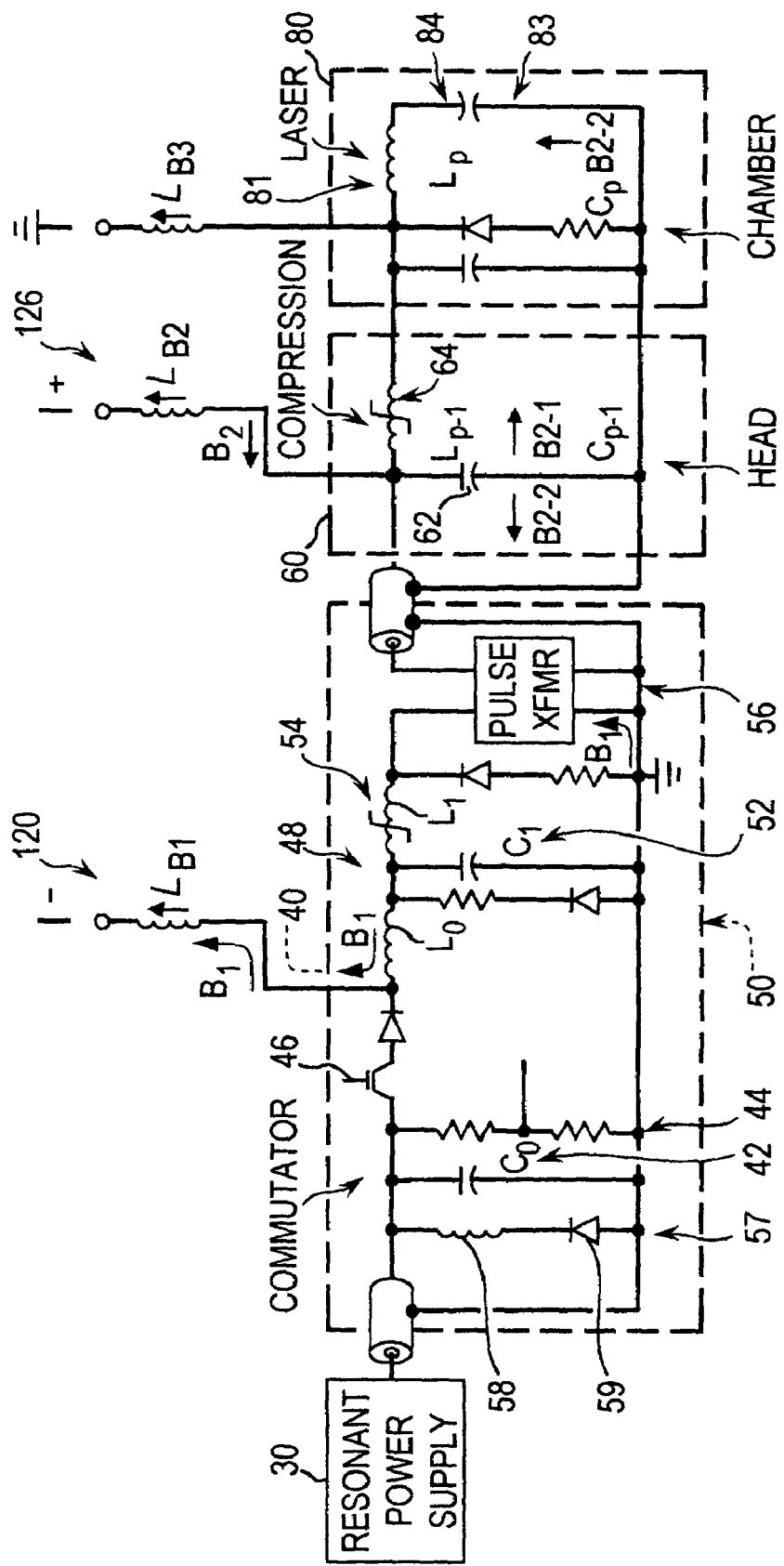
FIG. 1 shows a prior art pulse power circuit employing magnetic inductive reactors.
Figure 9:
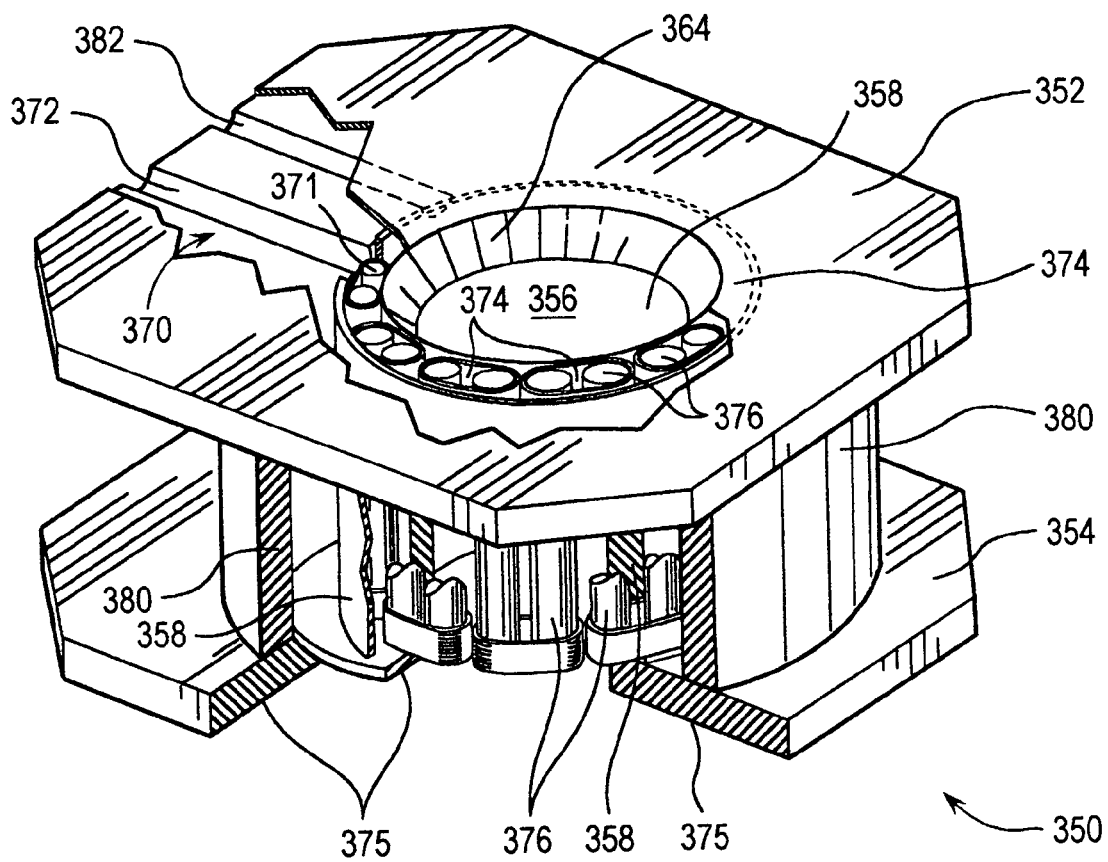

Turning now to FIG. 9, another embodiment of the present invention is shown, which may be embodied in a respective winding element 350 of a transformer, e.g., transformer 56 in FIG. 1. The winding element 350 may be in the form of a shroud with a right shroud wall 352 and a left shroud wall 354, together with a mandrel 358 forming a mandrel 358 extending between the right wall 352 and left wall 354 which each form flanges on the mandrel 358. The mandrel may have a center opening 356 through which extends the secondary winding of the transformer 56. As an example of the application of the present invention to the transformer 56 winding element 350 the right wall 352 may have formed therein a cooling inlet passage 372, shown in the partially cut-away portion 370 of the right wall 352, leading to a coolant inlet plenum 371 leading to a coolant vertical passage 376. As can be seen in FIG. 9, the coolant passages 376 may be formed in the mandrel 358 in a similar fashion to the housing 200 side wall coolant passages 240, and interconnected by coolant right side plenums 374 and coolant left side plenums 375 in the mandrel of the upper plenums 242 and lower plenums 244 in the housing 200 middle section 204.

The present invention employs a coating of insulating material on surfaces of adjacent components forming the housing 200, e.g., the inside wall 211, inside of the bottom 216 of the housing, and the inside of the cover 230, as well as components within the housing, e.g., the center column 212, the interior walls 262 of the channel 260 and the flange parts 256, 258 of the mandrel 250. Such an application of an—electrically insulating coating can be applied directly to the metal surfaces in question with a very high degree of coverage, i.e., essentially perfect coverage from an—electrically insulating perspective. The—electrically insulating material for the coatings has been selected to have very good dielectric strength properties, at least as good as Mylar or Kapton, but at the same time to have relatively high thermal conductivity properties as well (most electrical insulators are also thermal insulators as well). This improves the management of the thermal budget for the circuit element, e.g., magnetic inductors operating at high pulse rates, and thus, high average power.

The material may be deposited by any of a number of well known deposition techniques, e.g., plasma coating, flame or thermal spray coating, chemical or physical vapor deposition, etc. all of which can be utilized to deposit a generally thin film, with a very selectable thickness, e.g., in a range of about 10–500 $\mu$m. The materials may be selected from a group of electrically insulating though thermally conductive materials, such as parylene, aluminum oxide or other similar ceramic materials, including sapphire, aluminum nitride, or aluminum oxy-nitride and diamond or diamond like carbon ("DLC") coatings, an amorphous form of carbon with diamond bonding. The deposition process for some of these materials, e.g., coatings of alpha-alumina (amorphous alumina), Yttria stabilized zirconia, McrAIY and the like may be molecular bonded to the substrates on which the deposition is made, forming very thin films that are also pin-hole free and void free, but exhibit the necessary electrical resistivity and thermal conductivity. Such coatings are supplied, e.g., by applied Coatings, Inc. of Columbus, Ohio.

As an example a DLC coating, e.g., Diamonex, supplied by Diamonex of Allentown Pa., can be provided in the range of 0.001 to 10 $\mu$m having a resistivity of between $10^6$–$10^{12}$ ohms/cm, and with a thermal conductivity essentially like glass or metal. Parylene, useable in an embodiment of the present invention is also well known and consists of a polymer coating that conforms to virtually any shape and can also be applied at the molecular level by, e.g., a vacuum deposition process. Initially a vapor of Di-para-xylene, e.g., Parylene vapor is first pyrolized and then deposited under a vacuum in a deposition chamber to form the polymer coating. Parylene also has a high resistivity in the range of about $10^{16}$ and is a reasonable thermal conductor. Other well known parylene dimmers such as Parylene C, Parylene D, and Parylene N from Advanced Coating of Rancho Cucamonga, Calif., may be used.

In another aspect of the present invention the aluminum buswork of the reactor contained in the housing 200, e.g., the standoffs 302 connecting the top plate 298 and the bottom plate 300 of the magnetic core basket 150 and other similar standoffs outside of the housing 200 (not shown) may suffer from deterioration, e.g., of conductivity, especially as interfaced with another metallic conductor, e.g., at the screws in screw holes 304, 306. This has been discovered to result from presently utilized bare aluminum for such buswork, which has been discovered to form unwanted coatings, e.g., aluminum oxide, which is an insulator, at the interfaces, due in part to the environment in which the buswork component is present and/or in part to the current passing through the interface. In some cases the insulating coating can result in arcing and/or carbonization at the interface, which eventually can result in failure of the assembly, e.g., as arcing becomes more intense.

It has been proposed as a solution to this problem to place a coating, e.g., a chromate conversion coating, e.g., Chem Film, e.g., of specification MIL-C-5541 supplied by Sheffield Plates, on the exposed surfaces of the buswork, which can assist in insuring the surface of the buswork is electrically conductive and inhibit corrosion. However, such coatings, e.g., Chem Film are difficult to apply in an adequate thickness and are relatively very fragile and subject to compromise due, e.g., to scratching and abrasion. This then leads to the ineffectiveness of such a coating for the intended purpose.

Applicants have found that utilization of an electroless metal coating, e.g., an electroless nickel coating the advantages of, e.g., a Chem Film coating—low electrical resistivity and good corrosion resistance can be achieved without the detrimental implications of using the Chem Film or like coating. The more accurate control of the coating with a material such as electroless nickel, applied e.g., by plating processes, the control of which is well known in the art, can form a very robust coating that resists degradation from, e.g., scratching or abrasion and at the same time very effectively controls the resistance, e.g., surface resistance greatly improving the effectiveness and reliability of high pulse power circuit buswork.

The above described embodiments of the present invention are intended only for explanation and illustration purposes and are not the only embodiments in which the present invention may reside. Those skilled in the art will understand that many modifications and changes may be made to the described embodiments without changing the intent and spirit of the present invention. For example, the coolant passages need not be formed axially corresponding to the center axis of the housing or the mandrel as in the embodiments described, and may, e.g., through the use of, e.g., multiple sections forming the center section of, e.g., the housing or the mandrel to machine passages that extend, e.g., circumferentially around the central section of, e.g., the housing or the mandrel, or may be other than vertical, as shown in the Figures, but may be at an angle to the vertical, or other similar modifications. The embodiments described may also be modified in certain aspects of construction, e.g., utilizing different assembly techniques besides brazing, e.g., simply with screwed or bolted connections with suitable sealing, e.g., with o-rings, etc. The scope of the present invention, therefore, should be considered in light only of the appended claims and legal equivalents.

We claim:

1. A magnetic circuit element having a magnetic core disposed around a centrally located core support member having at least one core support member wall, comprising:
    a core support coolant inlet;
    a core support coolant outlet;
    a plurality of interconnected coolant flow passages contained within the core support member wall and interconnected and arranged to pass coolant from one coolant flow passage to the next within the core support member wall along a coolant flow path within at least a substantial portion of the core support member wall from the core support coolant inlet to the core support coolant outlet.

2. The apparatus of claim 1, further comprising:
    buswork elements electrically interconnecting electrical components of the magnetic circuit element having external surfaces coated with a thin film of an electroless metallic compound.

3. The apparatus of claim 2, further comprising:
    the electroless metallic compound is deposited by electroplating.

4. The apparatus of claim 1 further comprising:
    a housing containing the magnetic core and core support member, the housing comprising:
    a housing wall;
    a housing coolant inlet;
    a housing coolant outlet;
    a plurality of interconnected housing coolant flow passages contained within the housing wall and interconnected and arranged to pass coolant from one coolant flow passage to the next within the housing wall along a coolant flow path within at least a substantial portion of the housing wall from the housing coolant inlet to the housing coolant outlet.

5. The apparatus of claim 4, further comprising:
    the housing and the core support member each forming at least a portion of an electrical current flow path forming, respectively, at least a portion of a respective one of two turns around the magnetic core.

6. The apparatus of claim 1 further comprising:
    at least one high voltage physical component of the magnetic circuit element being electrically attached to a high voltage during at least a part of the operation of the magnetic circuit element;
    at least one common voltage physical component being electrically attached to a common or grounded voltage during at least a part of the operation of the magnetic circuit element;
    the at least one high voltage component and the at least one common voltage component being positioned with respect to each other such that at least a portion of a surface area of each of the high voltage component and the common voltage component require electrical insulation from each other;
    each of the at least one high voltage component and the common voltage component being coated on the respective portion of the surface area of each with a thin film of high resistivity and high thermal conductance material.

7. The apparatus of claim 6 further comprising:
the thin film is comprised of a material selected from the group of molecularly bonded organic and inorganic compounds having sufficiently high electrical resistivity and sufficiently high thermal conductivity.

8. The apparatus of claim 7 further comprising:
the thin film is comprised of aluminum oxide, aluminum oxy-nitride, aluminum nitride, sapphire, diamond, diamond-like carbon (DLC), or parylene.

9. The apparatus of claim 1 further comprising:
the core support member comprises a flange extending from the core support member, the flange having an inner dimension and an outer dimension, comprising:
a plurality of interconnected flange coolant flow passages extending alternatively toward the inner dimension and away from the outer dimension and then toward the outer dimension and away from the inner dimension, between the core support coolant inlet and the core support coolant outlet.

10. The apparatus of claim 9 further comprising:
a housing containing the magnetic core and core support member, the housing comprising:
a housing wall;
a housing coolant inlet;
a housing coolant outlet;
a plurality of interconnected housing coolant flow passages contained within the housing wall and interconnected and arranged to pass coolant from one coolant flow passage to the next within the housing wall along a coolant flow path within at least a substantial portion of the housing wall from the housing coolant inlet to the housing coolant outlet.

11. The apparatus of claim 10, further comprising:
the housing and the core support member each forming at least a portion of an electrical current flow path forming, respectively, at least a portion of a respective one of two turns around the magnetic core.

12. The apparatus of claim 1 further comprising:
each core support coolant flow passage is in fluid communication with a fluid communication plenum at each end of each respective core support coolant flow passage, with each respective fluid communication plenum forming an outlet plenum for at least a first one of the respective core support coolant flow passages and an inlet plenum for at least a second one of the respective core support coolant flow passages along the coolant flow path from the core support coolant inlet to the core support coolant outlet.

13. The apparatus of claim 12 further comprising:
the at least a first one of the respective coolant flow passages is a single core support coolant flow passage and the at least a second one of the respective coolant flow passages is a single core support coolant flow passage.

14. The apparatus of claim 13 further comprising:
a housing containing the magnetic core and core support member, the housing comprising:
a housing wall;
a housing coolant inlet;
a housing coolant outlet;
a plurality of interconnected housing coolant flow passages contained within the housing wall and interconnected and arranged to pass coolant from one coolant flow passage to the next within the housing wall along a coolant flow path within at least a substantial portion of the housing wall from the housing coolant inlet to the housing coolant outlet.

15. The apparatus of claim 14, further comprising:
the housing and the core support member each forming at least a portion of an electrical current flow path forming, respectively, at least a portion of a respective one of two turns around the magnetic core.

16. The apparatus of claim 12 further comprising:
the at least a first one of the respective coolant passages is a plurality of core support coolant flow passages and the at least a second one of the respective core support coolant flow passages is a plurality of core support coolant flow passages.

17. The apparatus of claim 16 further comprising:
a housing containing the magnetic core and core support member, the housing comprising:
a housing wall;
a housing coolant inlet;
a housing coolant outlet;
a plurality of interconnected housing coolant flow passages contained within the housing wall and interconnected and arranged to pass coolant from one coolant flow passage to the next within the housing wall along a coolant flow path within at least a substantial portion of the housing wall from the housing coolant inlet to the housing coolant outlet.

18. The apparatus of claim 17, further comprising:
the housing and the core support member each forming at least a portion of an electrical current flow path forming, respectively, at least a portion of a respective one of two turns around the magnetic core.

19. The apparatus of claim 12 further comprising:
a housing containing the magnetic core and core support member, the housing comprising:
a housing wall;
a housing coolant inlet;
a housing coolant outlet;
a plurality of interconnected housing coolant flow passages contained within the housing wall and interconnected and arranged to pass coolant from one coolant flow passage to the next within the housing wall along a coolant flow path within at least a substantial portion of the housing wall from the housing coolant inlet to the housing coolant outlet.

20. The apparatus of claim 19, further comprising:
the housing and the core support member each forming at least a portion of an electrical current flow path forming, respectively, at least a portion of a respective one of two turns around the magnetic core.

21. A magnetic circuit element having a magnetic core disposed around a centrally located core support member having at least one core support member wall, comprising:
a core support coolant inlet;
a core support coolant outlet;
a core support member cooling means comprising a plurality of interconnected core support coolant flow passages contained within the core support member wall for passing coolant through the plurality of interconnected core support coolant flow passages along a coolant flow path within at least a substantial portion of the core support member wall from the core support coolant inlet to the core support coolant outlet.

22. The apparatus of claim 21 further comprising:
a housing containing the magnetic core and core support member, the housing comprising:

a housing wall;
a housing coolant inlet;
a housing coolant outlet;
a housing cooling means comprising a plurality of interconnected housing coolant flow passages contained within the housing wall for passing coolant from one coolant flow passage to the next within the housing wall along a coolant flow path within at least a substantial portion of the housing wall from the housing coolant inlet to the housing coolant outlet.

23. The apparatus of claim 22, further comprising:
the housing and the core support member each forming at least a portion of an electrical current flow path forming, respectively, at least a portion of a respective one of two turns around the magnetic core.

24. The apparatus of claim 21 further comprising:
the core support member comprises a flange extending from the core support member, the flange having an inner dimension and an outer dimension, comprising:
a plurality of interconnected flange coolant flow passages extending alternatively toward the inner dimension and away from the outer dimension and then toward the outer dimension and away from the inner dimension, between the core support coolant inlet and the core support coolant outlet.

25. The apparatus of claim 24 further comprising:
a housing containing the magnetic core and core support member, the housing comprising:
a housing wall;
a housing coolant inlet;
a housing coolant outlet;
a housing cooling means comprising a plurality of interconnected housing coolant flow passages contained within the housing wall for passing coolant from one coolant flow passage to the next within the housing wall along a coolant flow path within at least a substantial portion of the housing wall from the housing coolant inlet to the housing coolant outlet.

26. The apparatus of claim 25, further comprising:
the housing and the core support member each forming at least a portion of an electrical current flow path forming, respectively, at least a portion of a respective one of two turns around the magnetic core.

27. The method of claim 26, further comprising:
the housing and the core support member each forming at least a portion of an electrical current flow path forming, respectively, at least a portion of a respective one of two turns around the magnetic core.

28. The apparatus of claim 21 further comprising:
each coolant flow passage is in fluid communication with a fluid communication plenum at each end of each respective core support coolant flow passage, with each respective fluid communication plenum forming an outlet plenum for at least a first one of the respective core support coolant flow passages and an inlet plenum for at least a second one of the respective core support coolant flow passages along the coolant flow path from the core support coolant inlet to the core support coolant outlet.

29. The apparatus of claim 28 further comprising:
the at least a first one of the respective core support coolant flow passages is a single core support coolant flow passage and the at least a second one of the respective core support coolant flow passages is a single core support coolant passage.

30. The apparatus of claim 29 further comprising:
a housing containing the magnetic core and core support member, the housing comprising:
a housing wall;
a housing coolant inlet;
a housing coolant outlet;
a housing cooling means comprising a plurality of interconnected housing coolant flow passages contained within the housing wall for passing coolant from one coolant flow passage to the next within the housing wall along a coolant flow path within at least a substantial portion of the housing wall from the housing coolant inlet to the housing coolant outlet.

31. The apparatus of claim 30, further comprising:
the housing and the core support member each forming at least a portion of an electrical current flow path forming, respectively, at least a portion of a respective one of two turns around the magnetic core.

32. The apparatus of claim 28 further comprising:
the at least a first one of the respective core support coolant passages is a plurality of core support coolant flow passages and the at least a second one of the respective core support coolant flow passages is a plurality of core support coolant flow passages.

33. The apparatus of claim 32 further comprising:
a housing containing the magnetic core and core support member, the housing comprising:
a housing wall;
a housing coolant inlet;
a housing coolant outlet;
a housing cooling means comprising a plurality of interconnected housing coolant flow passages contained within the housing wall for passing coolant from one coolant flow passage to the next within the housing wall along a coolant flow path within at least a substantial portion of the housing wall from the housing coolant inlet to the housing coolant outlet.

34. The apparatus of claim 33, further comprising:
the housing and the core support member each forming at least a portion of an electrical current flow path forming, respectively, at least a portion of a respective one of two turns around the magnetic core.

35. The apparatus of claim 28 further comprising:
a housing containing the magnetic core and core support member, the housing comprising:
a housing wall;
a housing coolant inlet;
a housing coolant outlet;
a housing cooling means comprising a plurality of interconnected housing coolant flow passages contained within the housing wall for passing coolant from one coolant flow passage to the next within the housing wall along a coolant flow path within at least a substantial portion of the housing wall from the housing coolant inlet to the housing coolant outlet.

36. The apparatus of claim 35, further comprising:
the housing and the core support member each forming at least a portion of an electrical current flow path forming, respectively, at least a portion of a respective one of two turns around the magnetic core.

37. A method of cooling a magnetic circuit element having a magnetic core disposed around a centrally located core support member having at least one core support member wall, comprising:
providing a core support coolant inlet;
providing a core support coolant outlet;

cooling the core support member utilizing a plurality of interconnected core support coolant flow passages contained within the core support member wall passing coolant through the plurality of interconnected core support coolant flow passages along a coolant flow path within at least a substantial portion of the core support member wall from the core support coolant inlet to the core support coolant outlet.

38. The method of claim 37 further comprising:
providing a housing containing the magnetic core and core support member, the housing comprising:
a housing wall;
a housing coolant inlet;
a housing coolant outlet;
cooling the housing utilizing a plurality of interconnected housing coolant flow passages contained within the housing wall passing coolant from one coolant flow passage to the next within the housing wall along a coolant flow path within at least a substantial portion of the housing wall from the housing coolant inlet to the housing coolant outlet.

39. The method of claim 38, further comprising:
the housing and the core support member each forming at least a portion of an electrical current flow path forming, respectively, at least a portion of a respective one of two turns around the magnetic core.

40. The method of claim 37 further comprising:
providing the core support member with a flange extending from the core support member, the flange having an inner dimension and an outer dimension, comprising:
cooling the flange with a plurality of interconnected flange coolant flow passages extending alternatively toward the inner dimension and away from the outer dimension and then toward the outer dimension and away from the inner dimension, between the core support coolant inlet and the core support coolant outlet.

41. The method of claim 40 further comprising:
providing a housing containing the magnetic core and core support member, the housing comprising:
a housing wall;
a housing coolant inlet;
a housing coolant outlet;
cooling the housing utilizing a plurality of interconnected housing coolant flow passages contained within the housing wall passing coolant from one coolant flow passage to the next within the housing wall along a coolant flow path within at least a substantial portion of the housing wall from the housing coolant inlet to the housing coolant outlet.

42. The method of claim 37 further comprising:
placing each core support coolant flow passage in fluid communication with a fluid communication plenum at each end of each respective core support coolant flow passage, with each respective fluid communication plenum forming an outlet plenum for at least a first one of the respective core support coolant flow passages and an inlet plenum for at least a second one of the respective coolant flow passages along the coolant flow path from the core support coolant inlet to the core support coolant outlet.

43. The method of claim 42 further comprising:
the at least a first one of the respective core support coolant flow passages is a single core support coolant flow passage and the at least a second one of the respective core support coolant flow passages is a single core support coolant passage.

44. The method of claim 43 further comprising:
a housing containing the magnetic core and core support member, the housing comprising:
a housing wall;
a housing coolant inlet;
a housing coolant outlet;
cooling the housing utilizing a plurality of interconnected housing coolant flow passages contained within the housing wall passing coolant from one coolant flow passage to the next within the housing wall along a coolant flow path within at least a substantial portion of the housing wall from the housing coolant inlet to the housing coolant outlet.

45. The method of claim 44, further comprising:
the housing and the core support member each forming at least a portion of an electrical current flow path forming, respectively, at least a portion of a respective one of two turns around the magnetic core.

46. The method of claim 42 further comprising:
the at least a first one of the respective core support coolant passages is a plurality of core support coolant flow passages and the at least a second one of the respective core support coolant flow passages is a plurality of coolant flow passages.

47. The method of claim 46 further comprising:
a housing containing the magnetic core and core support member, the housing comprising:
a housing wall;
a housing coolant inlet;
a housing coolant outlet;
cooling the housing utilizing a plurality of interconnected housing coolant flow passages contained within the housing wall passing coolant from one coolant flow passage to the next within the housing wall along a coolant flow path within at least a substantial portion of the housing wall from the housing coolant inlet to the housing coolant outlet.

48. The method of claim 47, further comprising:
the housing and the core support member each forming at least a portion of an electrical current flow path forming, respectively, at least a portion of a respective one of two turns around the magnetic core.

49. The method of claim 42 further comprising:
providing a housing containing the magnetic core and core support member, the housing comprising:
a housing wall;
a housing coolant inlet;
a housing coolant outlet;
cooling the housing utilizing a plurality of interconnected housing coolant flow passages contained within the housing wall passing coolant from one coolant flow passage to the next within the housing wall along a coolant flow path within at least a substantial portion of the housing wall from the housing coolant inlet to the housing coolant outlet.

50. The method of claim 49, further comprising:
the housing and the core support member each forming at least a portion of an electrical current flow path forming, respectively, at least a portion of a respective one of two turns around the magnetic core.

* * * * *